Patented Apr. 20, 1954

2,676,174

UNITED STATES PATENT OFFICE 2,676,174

CYCLOPENTANOPHENANTHRENE COMPOUNDS AND PROCESS

George Rosenkranz and Carl Djerassi, Mexico City, Mexico, assignors to Syntex S. A., Mexico City, Mexico, a corporation of Mexico No Drawing. Application May 21, 1951, Serial No. 227,529

5 Claims. (Cl. 260—239.55)

The present invention relates to novel cyclopentanophenanthrene compounds and to a process for the production thereof.

More particularly the present invention relates to $\Delta^{1,4,6}$-steroid trienones provided with the spiroketal side chain at the 16, 17 position character-

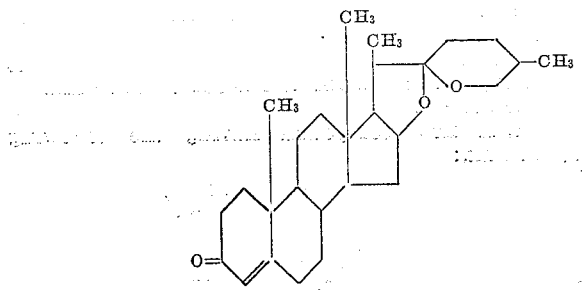

istic of the sapogenins and to a novel process for producing the same. Compounds of the character described are especially useful intermediates, as for example, as a starting material for hydrogenation studies and also because these compounds can be readily aromatized with elimination or migration of the angular methyl group to give phenols capable of being degraded into female sex hormones.

There has, therefore, been provided in accordance with the present invention a novel process for the production of $\Delta^{1,4,6}$-trien-3-one compounds having in the 16, 17 position the spiroketal or similar side chain of the sapogenins.

There has further been produced in accordance with the present invention certain novel dibromo intermediate compounds capable of being readily dehydrobrominated to produce the aforementioned $\Delta^{1,4,6}$-triens as well as a novel process which includes the production of the aforementioned dibromo compounds and their dehydrobromination.

The starting materials for the process of the present invention are $\Delta^4$-3-ketosapogenin compounds, as for example, $\Delta^4$-22-isospirosten-3-one, although other compounds of a similar nature, as for example, the normal 22-spirosten compounds may also be utilized, as will be hereinafter set forth.

The process of the present invention may be exemplified by the following equation:

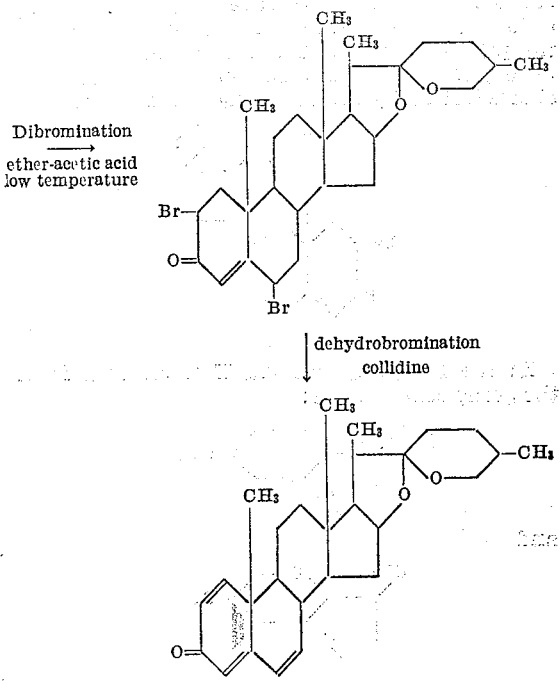

In practicing the above process a suitable compound, which may be characterized by the following general formula, is used:

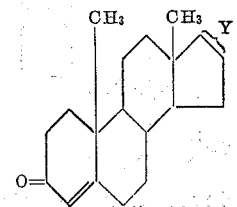

In the foregoing formula Y is selected from the group consisting of:

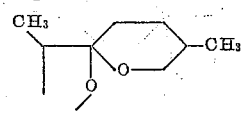

and

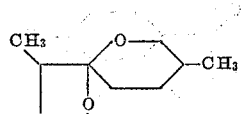

The above compounds are dibrominated as by dissolving the same in a suitable organic solvent, such as ether, at a temperature below 15° C., containing a few drops of hydrogen bromide in acetic acid. The ether solution is then treated dropwise with a solution of bromine (at least 2 mols) in glacial acetic acid. The reaction mixture is then allowed to stand in ice for a substantial period of time, as for example, one-half hour, and the colorless crystals of the corresponding 2,6-dibromo derivative are then filtered and washed with ether. Although preferably bromine in ether-acetic acid is utilized for the dibromination, other brominating agents, such as N-bromosuccinimide, may also be utilized. The dibromo derivatives are then dissolved, as for example, in collidine or other suitable dehydrobrominating agent and refluxed for approximately one hour with stirring. A suitable organic solvent, such as ether, is then added and the collidine is removed by washing with dilute aqueous acid and water and the ether solution dried and evaporated. The product may then be recrystallized from a suitable solvent, such as acetone, to produce the pure $\Delta^{1,4,6}$-trien. The compounds thus produced, i. e. the dibromo compounds, may be characterized by the following general formula:

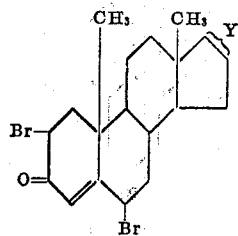

In the foregoing formula Y is selected from the group consisting of:

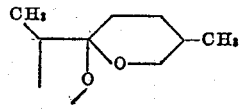

and

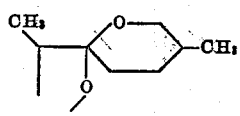

The novel trien compounds may be characterized by the following general formula:

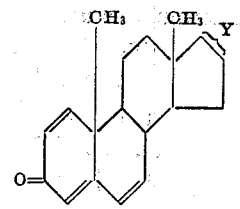

In the foregoing formula Y is selected from the group consisting of:

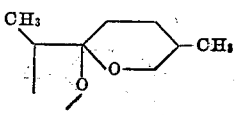

and

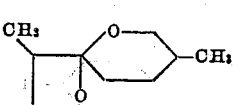

The following specific examples serve to illustrate but are not intended to limit the present invention:

*Example I*

A solution of 50 g. of $\Delta^4$-22-isospirosten-3-one in 1200 cc. of ice-cold ether containing a few drops of hydrogen bromide acetic acid was treated dropwise with a solution of 38.8 g. of bromine in 250 cc. of glacial acetic acid. After standing in ice for one-half hour the colorless crystals of 2,6-dibromo-$\Delta^4$-22-isospirosten-3-one were filtered and washed with ether. The compounds had a melting point of 205–207° C. (with decomposition) $(\alpha)_D^{20}$ —13.9° (chloroform); ultra-violet absorption maximum at 250 mu.

*Example II*

A solution of 50 g. of the dibromo derivative of Example I was refluxed with mechanical stirring for one hour with 300 cc. of redistilled collidine. After adding ether the collidine was removed by washing well with dilute aqueous acid and water, dried and evaporated. Several recrystallizations of the residue from acetone afforded pure $\Delta^{1,4,6}$-22-isospirostatrien-3-one with a melting point of 208–210° C. $(\alpha)_D^{20}$ —104.5°; ultra-violet absorption maximum at 222–256 and 296 mu.

We claim:

1. A new compound having the following formula:

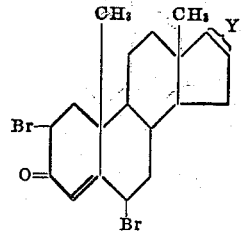

wherein Y is selected from the group consisting of:

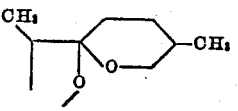

and

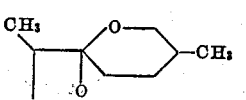

2. A new compound having the following formula:

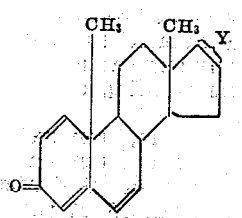

wherein Y is selected from the group consisting of:

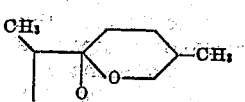

and

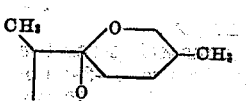

3. A new compound consisting of 2,6-dibromo-$\Delta^4$-22-isospirosten-3-one having a melting point of 205–207° C.

4. A new compound consisting of $\Delta^{1,4,6}$-22-isospirostatrien-3-one having a melting point of 208–210° C.

5. A process for producing a compound having the following formula:

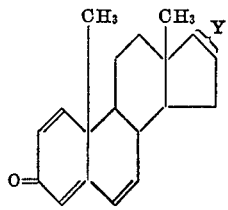

wherein Y is selected from the group consisting of:

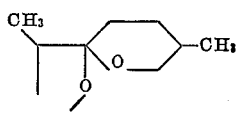

and

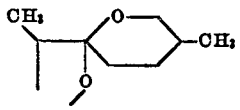

which comprises dibrominating a compound of the following formula:

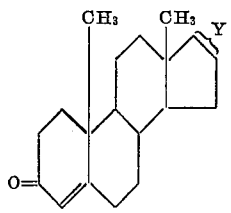

to form the corresponding 2,6-dibromo derivative and thereafter dehydrobrominating the dibromo derivative.

References Cited in the file of this patent

UNITED STATES PATENTS

| Number | Name | Date |
|---|---|---|
| 2,260,328 | Miescher | Oct. 28, 1941 |
| 2,280,828 | Inhoffen | Apr. 28, 1942 |
| 2,332,815 | Ruzicka | Oct. 26, 1943 |
| 2,340,388 | Inhoffen | Feb. 1, 1944 |
| 2,441,560 | Buterandt | May 18, 1948 |

OTHER REFERENCES

Inhoffen, Annalen 563, pp. 131–134 (1949).